(12) United States Patent
Naaman et al.

(10) Patent No.: US 7,769,745 B2
(45) Date of Patent: Aug. 3, 2010

(54) VISUALIZING LOCATION-BASED DATASETS USING "TAG MAPS"

(75) Inventors: Mor Naaman, San Francisco, CA (US); Marc E. Davis, San Francisco, CA (US); Alexander B. Jaffe, Beverly Hills, CA (US)

(73) Assignee: Yahoo! Inc., Sunnyvale, CA (US)

( * ) Notice: Subject to any disclaimer, the term of this patent is extended or adjusted under 35 U.S.C. 154(b) by 278 days.

(21) Appl. No.: 11/639,563

(22) Filed: Dec. 15, 2006

(65) Prior Publication Data

US 2008/0148175 A1    Jun. 19, 2008

(51) Int. Cl.
   *G06F 7/00* (2006.01)
   *G06F 17/30* (2006.01)
(52) U.S. Cl. ............................ 707/713; 715/781
(58) Field of Classification Search .................. None
   See application file for complete search history.

(56) References Cited

U.S. PATENT DOCUMENTS 7,634,465 B2 * 12/2009 Sareen et al. ..................... 1/1

2006/0085392 A1 * 4/2006 Wang et al. ..................... 707/3
2007/0067104 A1 * 3/2007 Mays ............................ 701/211
2007/0161382 A1 * 7/2007 Melinger et al. ........... 455/456.1
2008/0172632 A1 * 7/2008 Stambaugh .................. 715/781

OTHER PUBLICATIONS

"Gutenkarte" Book Catalog, 2006 MetaCarta, Inc., www.gutenkarte.org (10 pp).

* cited by examiner

*Primary Examiner*—Uyen T. Le

(57) ABSTRACT

The visualization of datasets by associating text (keywords) with location and optionally with time is provided. This visualization may help the user better understand and analyze the contents of the dataset. The visualization takes as input a keyword and related parameters such as location, importance/relevance factors, time, visualization level, and keyword category, and displays the selected keywords on a map, at their associated location, with the size or other characteristic of the keyword varying according to its relevance.

25 Claims, 7 Drawing Sheets

VISUALIZING LOCATION-BASED DATASETS USING "TAG MAPS"

BACKGROUND OF THE INVENTION

A dataset is a collection of information. Some datasets associate the collected information with location information, and may be referred to herein as location-based datasets. One example of a location-based dataset is a collection of digital photographs publicly available at a web site such as flickr.com, which is a public photo sharing site. At such web sites, persons who submit photos can add short contextual labels or "tags" to their photos such as the place at which the photo was taken, in addition to any device-generated context information. These labels help others search for and locate the photo. These tags are often related to the photo in some way, such as by subject, time, location (geo-reference information), etc. Another example of a dataset is a collection of words used in Short Message Service (SMS) messages (i.e. cellular telephone text messages), perhaps those sent or received from a certain geographic area. Other examples of datasets include restaurants searched by users on Yahoo! Local, search results or search terms, news reports and other location-annotated information. In general, although different datasets may include diverse types of information, each item in any dataset sharing some commonality with other elements or information in the dataset.

Mobile devices, including, but not limited to, mobile phones and digital cameras, represent just one example of devices capable of generating location-dependent datasets. Such mobile devices are capable of determining or capturing information capable of at least partly defining the context of the environment in which they are used. For example, in addition to temporal information such as time and date, location services may be used to supply spatial information about the device such as latitude and longitude from a Global Positioning System (GPS) device. Such spatial information may be associated with messages, digital photographs or other content sent, received or otherwise captured by a mobile device, thereby providing spatial context for the content.

Some context information, typically time and date information, may be automatically generated by a device (referred to generally as device-generated data) and associated with the content. For example, a mobile phone may automatically generate time and date metadata associated with the capture of a digital photograph or the transmission of a Short Message Service (SMS) text message. Additionally, subjective semantic information may be entered by a user at the time of capture (or later) and associated with the content.

While location-based datasets have the potential to provide useful information, often the raw information in a dataset is often too voluminous, complex, disorganized and generally hard to understand and grasp as a whole. Therefore, it would be generally beneficial to derive only the information of most interest to the user from a dataset, by identifying or deriving keywords from the dataset selected in accordance with some metric or relevance parameter representing, for example, the most popular or frequently occurring tags associated with the information in the dataset.

U.S. application Ser. No. 11/437,344, filed on May 19, 2006 and entitled "Summarization of Media Object Collections," and U.S. application Ser. No. 11/593,668, filed on Nov. 6, 2006 and entitled "Context Server for Associating Information Based on Context," the contents of which are incorporated herein by reference, in some embodiments describe an algorithm for identifying or deriving keywords from a dataset in accordance with their popularity or some other metric. As described in these applications, a context server may receive stored datasets containing one or more of context information, media objects, and user-generated subjective characterization information associated with the context information from one or more users. The context information in these datasets may include metadata that relates to time, date, location, ambient conditions, aperture, shutter speed, and other settings (for digital photos), biometrics (e.g., relating to the user of the device), device/user identifications, geographical reference data (e.g., from a GPS location device, cell identification, or other location technology), or combinations thereof. The user-generated subjective characterization information may include one or more tags for a media object, such as a title, a description of the image, annotations, geographical location and comments.

The context server associates service information with the user-generated subjective characterization information based on the context information. The service information may include, but is not limited to, keywords identifying popular or heavily searched points of interest, locations (e.g. streets, towns, cities, and the like), restaurants, people, advertisements, popular words in context-based messages, sponsored search advertisements, or combinations thereof. Along with these keywords or labels, the service information may include other values associated with each label and obtained from the context information and the user-generated subjective characterization information, such as a latitude, longitude, a time or date or range for which the information is valid, and one or more associated values such as a value indicating the popularity of the label.

However, even with service information (e.g. popular keywords) derived from the dataset, it may still be difficult for a user to geographically relate with those keywords and place them in context with his/her surroundings. In other words, consistent with the phrase "A picture is worth a thousand words," users may derive a certain level of benefit and comfort from being able to compartmentalize the keywords by visually seeing a representation of a location associated with these keywords and how the keywords physically relate to the world, thereby providing a geographic context to aid in understanding them.

Therefore, it would be advantageous to visualize keywords derived from datasets, including "arbitrary" keywords normally thought of as being not intrinsically linked to any particular geographical feature (e.g. movies, people, words in SMS messages), by enabling a user to see those keywords on a map with some further indication of the extent of their popularity, relevance or relationship to some metric.

Conventional systems for relating keywords to geographic locations include conventional maps, which show larger cities in larger text. FIG. 1 is an illustration of an exemplary conventional map of San Francisco, Calif. and surrounding areas, showing a few landmarks and cities whose text varies according to their size (e.g. Oakland is in a larger font than Alameda). Another conventional system is Gutenkarte (see http://www.gutenkarte.org/), which uses a map to visualize geographic locations mentioned in books, with the geographic location names being shown in various sizes according to the number of times they were mentioned. Stanley Milgram introduced the idea of displaying landmarks sized in accordance with their popularity in 1976. However, these conventional systems only display location-dependent objects (e.g. cities and/or landmarks) tied to a particular geographic region, and none or these systems display keywords not intrinsically linked to any particular geographical feature (e.g. movies, people, words in SMS messages).

BRIEF SUMMARY OF THE INVENTION

Embodiments of the invention visualize datasets by associating text (keywords) with location and optionally with time. This visualization may help the user better understand and analyze the contents of the dataset. The visualization takes as input a keyword and related parameters such as location, importance/relevance factors, time, visualization level, and keyword category, and displays (visualizes) the selected keywords on a map, at their associated location, with the size or other characteristic of the keyword varying according to its relevance to some metric (e.g. popularity).

To visualize the keywords on a map, visualization data must have been received or made available, and map data must have been received or made available. Visualization data may be generated by a context server located at the server side, or by a computer located at the client side. The visualization data according to embodiments of the invention may contain keywords tied to a particular geographic location (e.g. cities and landmarks) and associated relevance parameters, but also geographically independent keywords (e.g. people, movie titles, current events, search terms, products, and the like) that are not intrinsically linked to any particular geographical feature but nonetheless have been associated with a particular location, along with their location and relevance parameters. These keywords may be referred to as location-based keywords.

The visualization data may be pre-computed all at once, in advance of any selection of a map area, or may be computed in an ad hoc manner "on the fly," only when a particular map area is specified. When the visualization data is pre-computed, visualization data is generated from all keywords in the dataset without regard to the location associated with the keywords. When the visualization data is computed in an ad hoc manner, visualization data is generated from only those keywords associated with a location within the selected map area.

Map data can also be rendered both on the server or on the client. For example, when a user selects a certain map area, in some embodiments raw map data is retrieved from a map server on the server side and transmitted to the client side, where the client-side computer utilizes the raw map data and a rendering program to display the selected map data on the client-side computer. Alternatively, a rendering program may be executed at the server side to operate on the raw map data and generate rendering data that need only be transmitted to the client side for display on the client-side computer. In other embodiments, map data can be generated and maps may be rendered from any other source.

Before the keywords can be visualized (i.e. before they can appear on a map), the visualization data must be applied to the keywords in accordance with a visualization scheme that applies appearance information to keywords in accordance to keyword relevance. When visualization data is applied to a keyword, the result may be referred to herein as presentation data. For example, the presentation data for "flagsofourfathers" may comprise the text "flagsofourfathers" along with code for rendering the text in 12-point font, specification of colors and other visual elements, as well as specification regarding the visual/map location in which to render the keyword.

The visualization scheme for the selected location-based keywords may also be established. In some embodiments, all presentation data will follow the same visualization scheme.

Any number of visualization schemes may be employed, including, but not limited to, size (e.g. with more popular or more recent keywords being larger), color (e.g. with more popular or more recent keywords being brighter colors (red for the most popular or more recent keywords)), shadings (e.g. with more popular or more recent keywords being darker), three-dimensional (e.g. with more popular or more recent keywords being taller), blinking or animation (e.g. with more popular or more recent keywords blinking faster, fading in and out faster, moving or wiggling faster, etc.), and the like. In addition to these visualization schemes, the keywords themselves may be supplemented by or replaced with symbols, icons, links to web sites or web pages, graphics, thumbnail pictures, and the like, and these items may also vary in size, color, or shading, and may blink, fade in and out, pop-up, and the like. The visualization algorithm may have a fixed visualization scheme for all keywords or may have different schemes for different keyword categories, or alternatively the visualization schemes may be user-selectable.

The visualization scheme may then be applied to the location-based keywords to be converted to presentation data. For example, if "movie titles" appearing in text messages are to be converted to presentation data according to where the text message was sent, and a font size visualization scheme is to be employed using three font sizes, then the three most relevant (e.g. popular) keywords having a keyword category of "movie title" may be assigned to the appropriate font sizes. In other embodiments, some presentation data may be assigned the same appearance information (e.g. assigned the same font size) to indicate similar relevance characteristics. One skilled in the art will recognize that a similar assignment of visualization scheme to keywords can be applied to other visualization schemes and keyword categories.

The presentation data may be pre-computed all at once, in advance of any selection of a map area, or may be computed in an ad hoc manner "on the fly," only when a particular map area is specified. When the presentation data is pre-computed, presentation data is generated from all keywords without regard to the location associated with the keywords. However, only the presentation data that is located within the map area selected by the user will be visualized (appear on the map). When the presentation data is computed in an ad hoc manner, presentation data is generated from only those keywords associated with a location within the selected map area. Presentation data may be generated by a server located at the server side, or by a computer located at the client side. In still other embodiments, the presentation computation mode is user-selectable.

In some embodiments of the invention, the presentation data can be dependent on zoom level, screen-viewable area, type of screen, screen resolution and the like, and the decisions on how to further modify the presentation data may be made either in the client or the server. For example, if the presentation data includes keywords sized in five different fonts according to some measure of keyword relevance, but a server or processor at either the client or server determines or is made aware that either the zoom level is very high (i.e. "zoomed out"), the screen size is small, and/or the screen resolution is low, the smallest font sizes may not be readable. Accordingly, the server or processor may further modify the presentation data to increase all font sizes, eliminate the presentation data with font sizes smaller than a certain level, or take other measures to ensure that the presentation data that is ultimately visualized is readable. In another example, if the presentation data includes keywords in five different colors according to some measure of keyword relevance, but a server or processor at either the client or server determines or is made aware that the display device is monochrome (e.g. black and white) or limited in color resolution, the color distinctions may not be visible when visualized. Accordingly, the server or processor may further modify the presentation data to replace color distinctions with some other visual distinction (e.g. font size distinctions) or take other measures to ensure that the presentation data that is ultimately visualized is properly distinguishable. In yet another example, if the presentation data includes keywords in one or more fonts according to some measure of keyword relevance, but a server or processor at either the client or server determines or is made aware that the screen resolution is insufficient to make the different fonts distinguishable or that one or more of the fonts are not supported, the font distinctions may not be visible when visualized. Accordingly, the server or processor may further modify the presentation data to replace font distinctions with some other visual distinction (e.g. color distinctions) or take other measures to ensure that the presentation data that is ultimately visualized is properly distinguishable. Those skilled in the art will recognize that any number of presentation data modifications may be made to ensure that the visualized keywords are properly distinguishable.

If the presentation data is pre-computed, the location-based keywords to be converted to presentation data may be established. In some embodiments, all keywords are modified and converted into presentation data. In these embodiments, keywords to be visualized may already have been limited to a particular category (e.g. cities), or may fall into a number of different selected categories (e.g. cities, landmarks, movies, people and the like). In other embodiments, the keywords to be converted to presentation data are category-dependent. If the keywords to be converted are category-dependent, keywords may have a "category" parameter (e.g. cities, landmarks, movies, people, and the like, and the user may select one or more of these categories of keywords to be converted to presentation data.

The map area to be displayed may be established. In some embodiments, the map area is fixed, but other embodiments, the map area is user-selectable.

Whether the visualization is to be time-dependent may also be established. In some embodiments, there is no time-dependency. If no time-dependency is selected, all location-based keywords to be visualized will be visualized. In other embodiments, visualization is time-dependent, and only those keywords having a time/date stamp (a parameter associated with the keyword) corresponding to a particular time, date or range will be visualized. In still other embodiments, this is user-selectable. In time-dependent visualization, either the visualization algorithm may automatically determine a time, date or range (in some embodiments selecting the range based on the keywords to be visualized having the earliest and latest time/date stamps), or the user may select a time, date or range, or whether the visualization is to be animated.

The presentation data may then be rendered (visualized) by a server located at the server side, or by a computer located at the client side, or by any device capable of generating rendering data.

In some embodiments, the location-based keywords are visualized by applying the presentation data to the map data, and the modified map data may be sent to the user for rendering on the user's web browser. In time-independent visualization, only a single map is rendered. However, in time-dependent visualization, a fixed or user-selectable time, time/date, time range or date range may be used to limit the keywords to be displayed. Alternatively, if a particular time or date range is selected, a sequence of modified map data may be transmitted for rendering, each set of modified map data in the sequence representing a different time or date in the selected time or date range. As these views are rendered, the keywords will appear and disappear in accordance with their associated time/date stamps. The views may be rendered automatically, giving the user a time-dependent animation, or the user may step through the different views one at a time. In other embodiments, the location-based keywords and the map data are sent separately to the user's web browser, where rendering logic combines the information before rendering it.

Note that if the user "pans" to a different location, effectively selecting a different map area, the visualization process and transmission process may be repeated in preparation for map re-rendering. When this occurs, some previously hidden keywords may appear, and some previously displayed keywords may disappear.

Additionally, if the user zooms in and out, effectively selecting a different map area, the visualization process and transmission process will be repeated when the map is re-rendered. When this occurs, in some embodiments the displayed keywords may change according to a visualization level parameter associated with the keywords that identifies a particular zoom or geographic level (e.g. city, state, etc). Alternatively or additionally, the keywords may be filtered according to some other parameter such as frequency of occurrence, so that only a subset of the keywords is shown. For example, if a user is viewing a map of San Francisco with a visualization level of "city," all restaurants with 10 or more occurrences or some threshold value may appear. However, at a visualization level of "state," only restaurants with 50 or more occurrences may appear, or only the five restaurants with the most occurrences may appear.

DETAILED DESCRIPTION OF THE INVENTION

Embodiments of the invention visualize datasets by associating text (keywords) with location and optionally with time. This visualization may help the user to better understand and analyze the contents of the dataset. The visualization takes as input a keyword and related parameters such as location, importance/relevance factors, time, visualization level, and keyword category, and displays (visualizes) the selected keywords on a map, at their associated location, with the size or other characteristic of the keyword shown according to its relevance to some metric (e.g. popularity).

Figure 1:
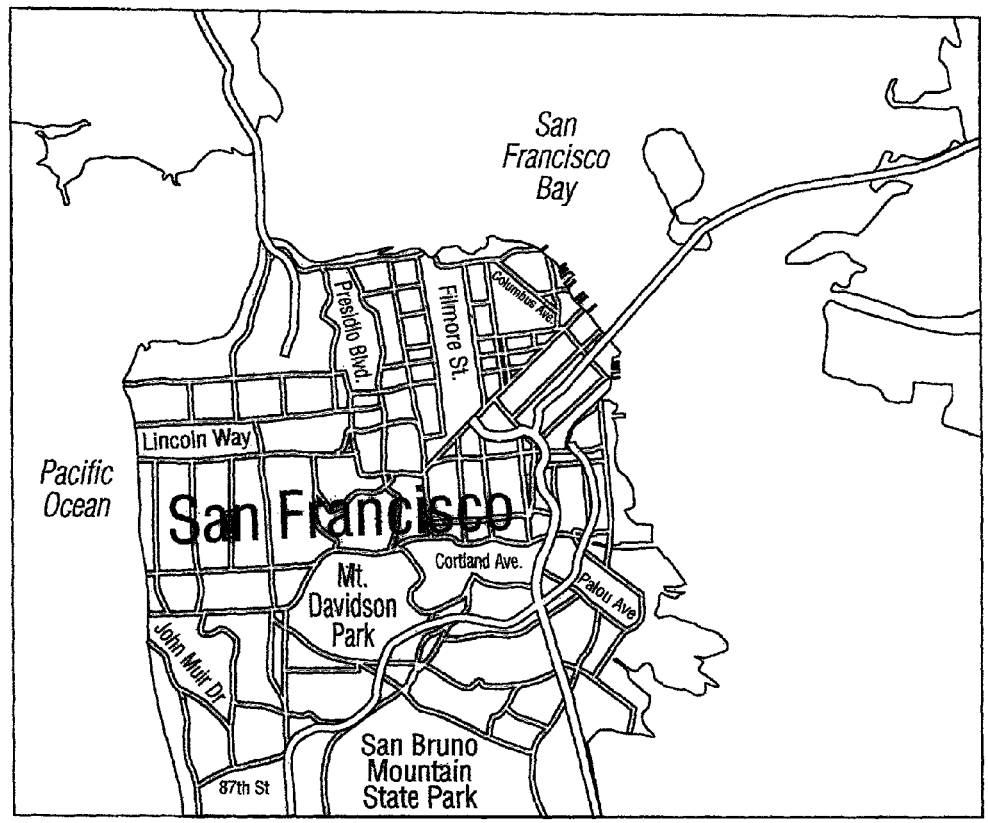
FIG. 1 is an illustration of an exemplary conventional map of San Francisco, Calif. and surrounding areas, showing a few landmarks and cities whose text varies according to its size.
Figure 2:
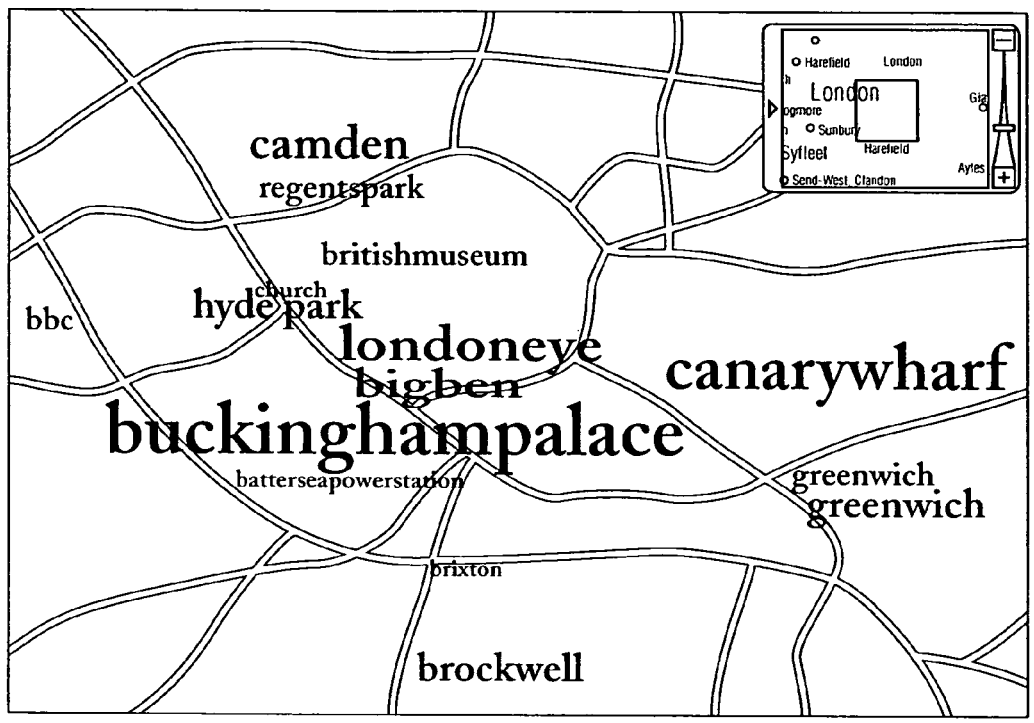
FIG. 2 is an illustration of an exemplary map showing popular landmarks and attractions according to embodiments of the invention.

FIG. 2 is an illustration of an exemplary map showing popular landmarks and attractions in a dataset according to embodiments of the invention. Note that FIG. 2 shows landmarks (e.g. Big Ben) and additionally a company (the British Broadcasting Corporation, or BBC) sized according to their popularity.

Figure 3:
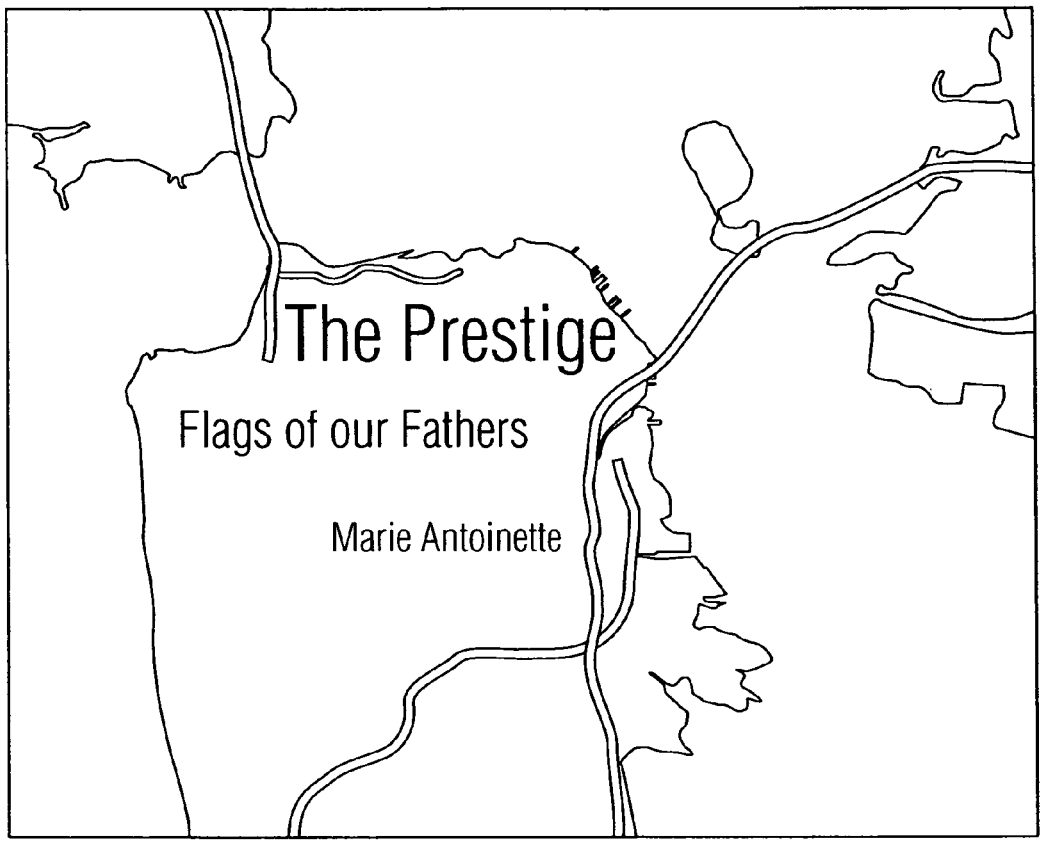
FIG. 3 is an illustration of an exemplary map showing the most popular movie titles appearing in SMS messages originating from a particular location according to embodiments of the invention.

FIG. 3 is an illustration of an exemplary map showing the most popular movie titles appearing in a dataset of SMS messages originating from San Francisco, Calif. according to embodiments of the invention. In FIG. 3, the keywords are visualized at the specific location within San Francisco at which the messages originated. Note that FIG. 3 shows the movie titles "Flags of Our Fathers," "The Prestige," and "Marie Antoinette" sized according to their popularity, these keywords not normally being intrinsically linked to a particular geographic location or feature. In other embodiments, keywords may be visualized in accordance with relevance parameters not related to the number of times this keyword appeared in the dataset. For example, movie titles may be visualized in accordance with a relevance parameter of "box office gross," or restaurants may be visualized in accordance with a relevance parameter of "restaurant rating."

Figure 4:
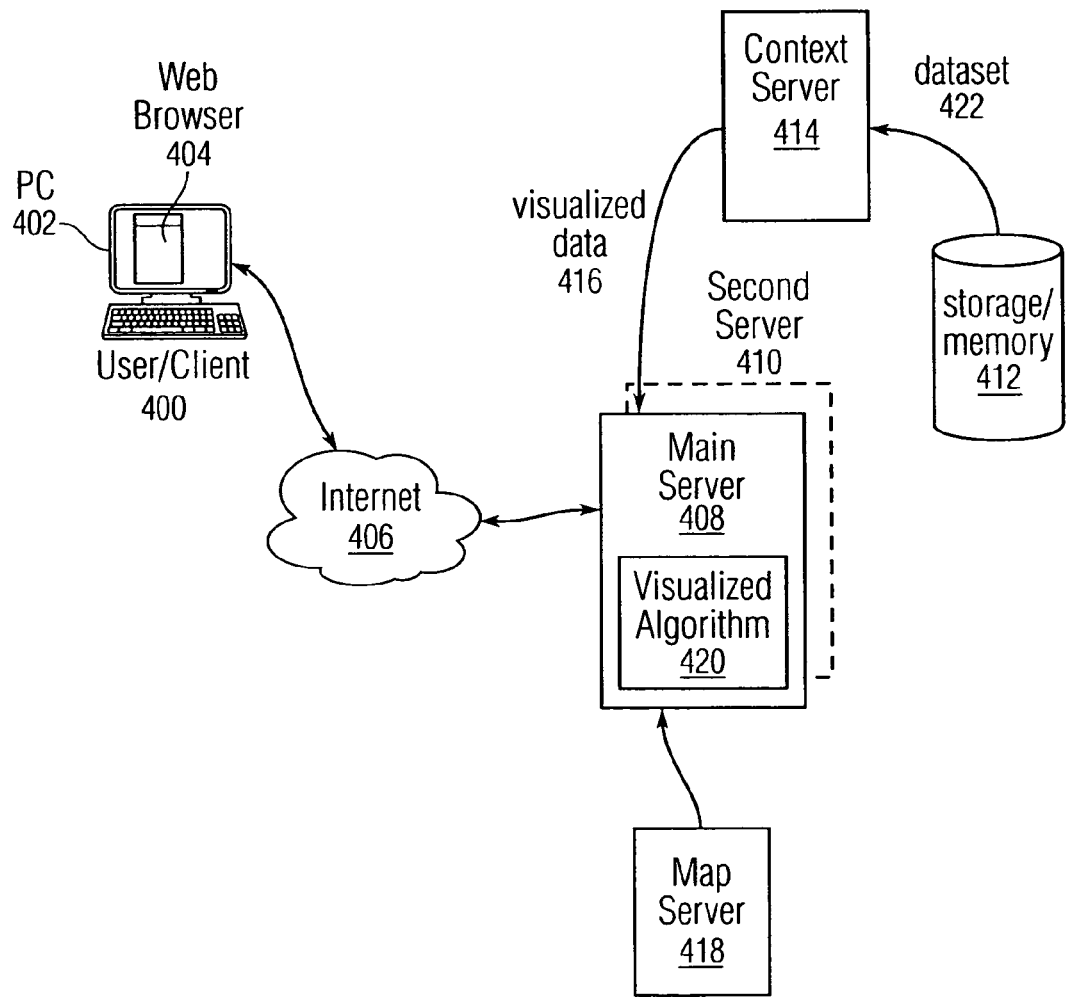
FIG. 4 illustrates an exemplary system level diagram for implementing embodiments of the invention involving an individual user.

FIG. 4 illustrates an exemplary system level diagram for implementing embodiments of the invention involving an individual user. A user or client 400 at a personal computer 402 and executing a web browser 404 and optionally a client-side visualization application may access a web site over the Internet or other network 406 such as flickr.com being hosted on a main server 408. In some embodiments, the main server 408 may be executing a visualization algorithm 420 (discussed in further detail below) to perform visualization at the web site. In alternative embodiments, the main server 408 may be in communication with a second server 410 over a private network or the Internet, wherein the visualization algorithm 420 is performed at the second server and the results are sent back to the main server.

A storage device or memory 412 may store one or more datasets such as a dataset of photos, SMS messages, search terms, and the like. A context server 414 may operate on one or more datasets 422 to generate visualization data 416 comprised of keywords or labels and other values associated with each label such as a latitude, longitude, a time or time range for which the information is valid, and one or more associated relevance values such as a value indicating the popularity of the label. Although FIG. 4 shows the context server as a different entity from the main and optional second servers, these servers may in fact be the same server, separate servers, or any combination of servers.

In some embodiments, the user may use a client-side application to request that certain visualization data be visualized using a particular visualization scheme, and may also request a particular map area. The main server 408 or second server 410 then performs the visualization algorithm on the visualization data 416 and map data from a map server 418. The map server 418 produces map information in accordance with a geographic request from the user 400, and although the map server is shown in FIG. 4 as a separate server, it may be the same server as any one of the main server 408, second server 410, or context server 414. The main server 408 or second server 410 then produces rendering information and transmits it to the personal computer 402 so that can be rendered by the web browser 404.

In other embodiments, the user may use the client-side application to request a particular map area from the map server 418, which then sends map data back to the user's computer 402. The user may also request visualization data to be visualized in the selected map area in an ad-hoc manner. The main server 408 or second server 410 may then respond by generating presentation data from the visualization data in the selected map area in accordance with a visualization scheme that may also have been requested by the user. The resulting presentation data may then be transmitted back to the user's computer 402, where it may be combined with the map data and rendered at the web browser 404.

In still further embodiments, the user may use the client-side application to request visualization data to be visualized, and the main server 408 or second server 410 may then respond by generating presentation data from the visualization data in accordance with a visualization scheme that may also have been requested by the user, without any map area restriction. The resulting presentation data may then be transmitted back to the user's computer 402, where it is combined with the map data and rendered at the web browser 404.

In other embodiments, the main server 408 or second server 410 may perform pre-processing and generate presentation data from the visualization data in accordance with a visualization scheme, without any map area restriction. All presentation data may then be downloaded by a user to the user's computer 402, so that when the user selects a particular map area, the presentation data in the selected map area will be rendered along with the map.

Figure 5:
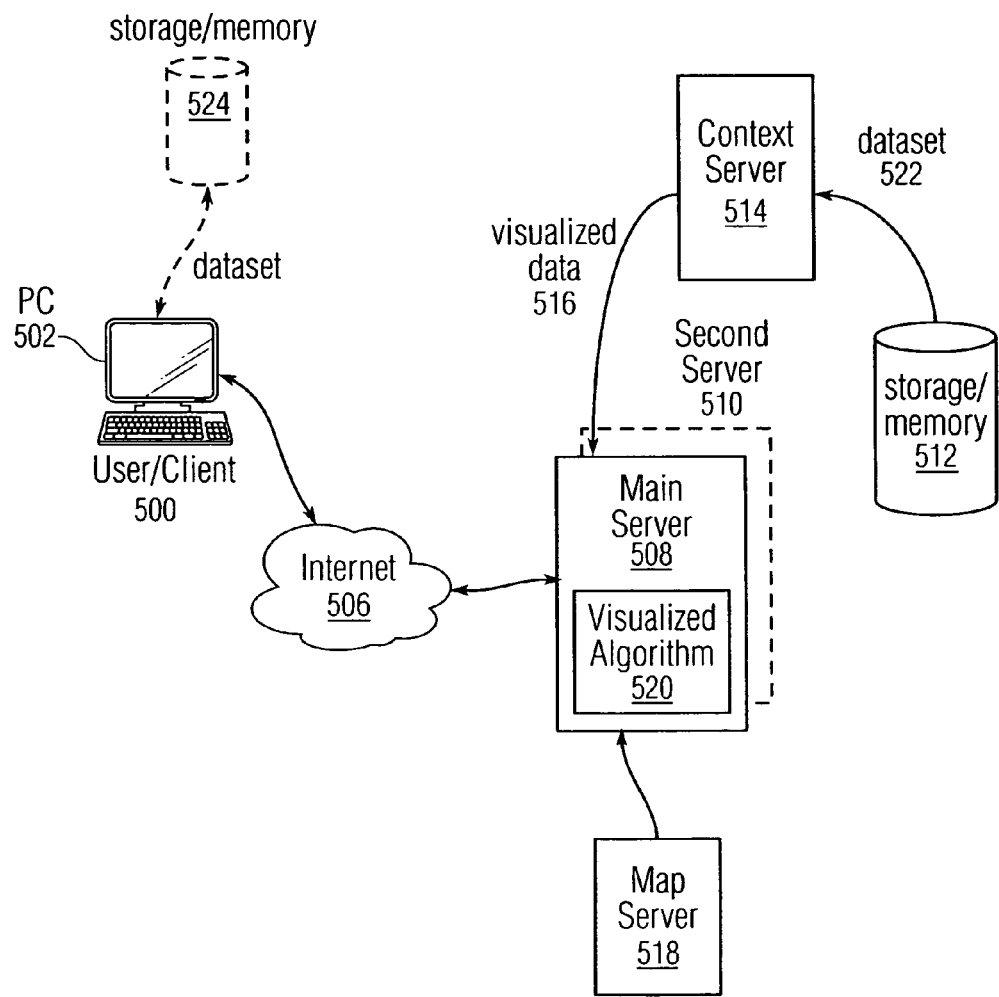
FIG. 5 illustrates an exemplary system level diagram for implementing embodiments of the invention in which the user is a company or developer.

FIG. 5 illustrates an exemplary system level diagram for implementing embodiments of the invention in which the user/client 500 is a company or developer. In such embodiments, the user 500 may be at a server or web site that allows the user to specify both a dataset and a map area.

In the commercial or developer embodiments shown in FIG. 5, the user or client 500 may be an employee at a company having its own dataset in storage or memory 524. The company may send its dataset to the context server 514 and a map area of interest to the map server 518 over the Internet 506 (perhaps through the main server 508) so that keywords can be generated from the dataset, presentation data can be generated, and the presentation data can be visualized on a map using the main server 508 or second server 510.

The visualization algorithm may be implemented by visualization and rendering logic within the main or second server of FIG. 4 or 5. The visualization and rendering logic may be a processor programmed for executing the visualization algorithm, or a state machine or other dedicated logic for executing the visualization algorithm. The visualization logic applies a visualization scheme to location-based keywords that generates visualization information for each keyword in accordance with a popularity parameter associated with the keyword. The rendering logic integrates the visualization information for each location-based keyword with map data in accordance with a location parameter associated with the keyword to enable the one or more keywords to be rendered along with the map data in accordance with their location and popularity. In other embodiments, the rendering logic may be part of the client-side application.

Figure 6:
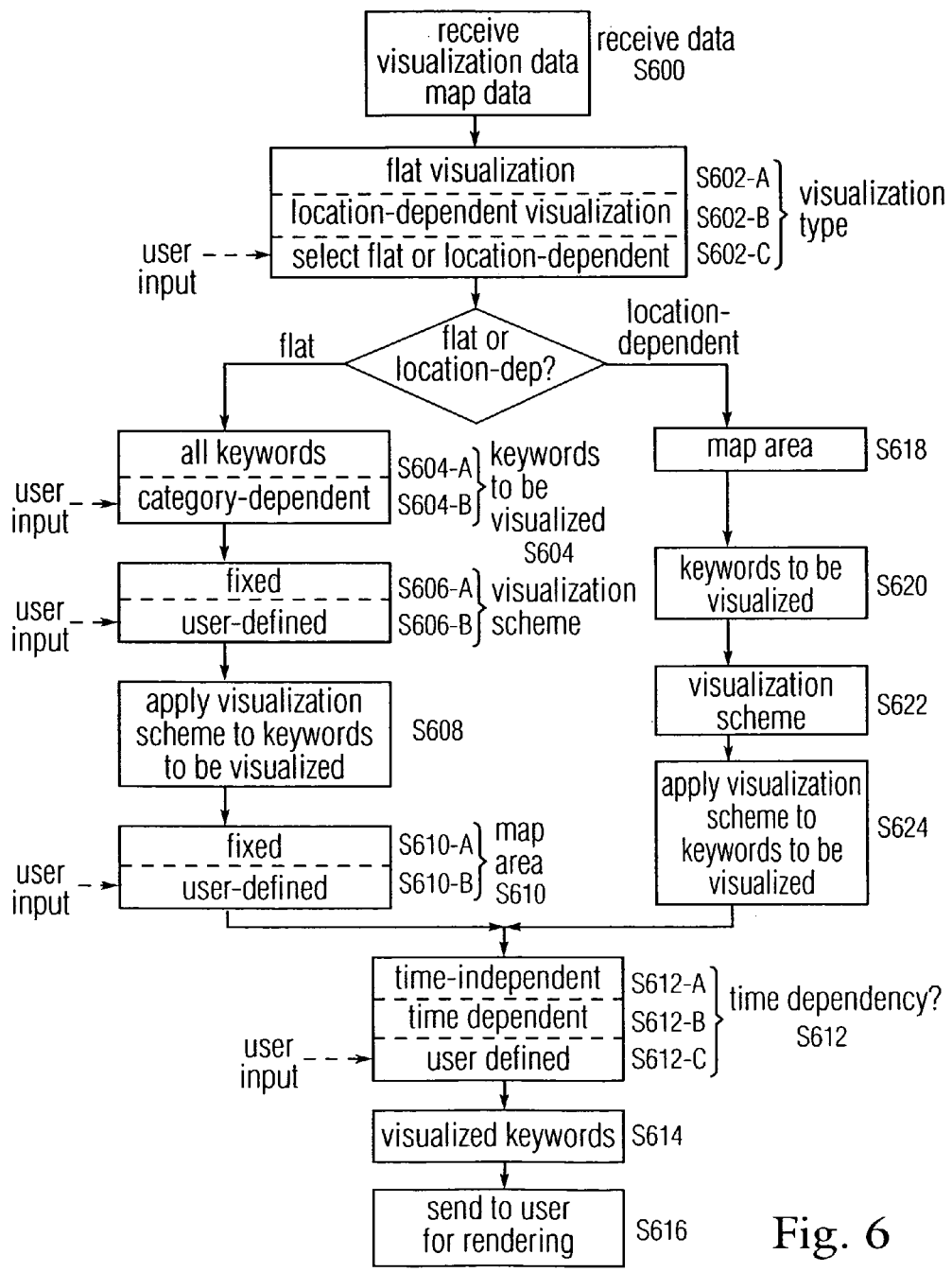
FIG. 6 is a flow diagram illustrating the main steps of the visualization algorithm according to embodiments of the invention.

FIG. 6 is a flow diagram illustrating the main steps of the visualization algorithm according to embodiments of the invention. One skilled in the art will recognize that the order of some of these steps may be changed without affecting the final visualization.

To visualize the keywords on a map, visualization data must have been received or made available, and map data must have been received or made available from the map server (see step S600) or some other source. Visualization data may be generated by a context server located at the server side, or by a computer located at the client side. Although the visualization data may have been received from the previously described context server, the present invention is applicable to any dataset, however it may have been compiled. The visualization data according to embodiments of the invention may contain keywords tied to a particular geographic location (e.g. cities and landmarks) and associated relevance parameters, but also geographically independent keywords (e.g. people, movie titles, current events, search terms, products, and the like) that are not intrinsically linked to any particular geographical feature but nonetheless have been associated with a particular location, along with their location and relevance parameters. These keywords may be referred to as location-based keywords.

The visualization data may be pre-computed all at once, in advance of any selection of a map area, or may be computed in an ad hoc manner "on the fly," only when a particular map area is specified. When the visualization data is pre-computed, visualization data is generated from all keywords in the dataset without regard to the location associated with the keywords. When the visualization data is computed in an ad hoc manner, visualization data is generated from only those keywords associated with a location within the selected map area.

Map data can also be rendered both on the server or on the client. For example, when a user selects a certain map area, in some embodiments raw map data is retrieved from a map server on the server side and transmitted to the client side, where the client-side computer utilizes the raw map data and a rendering program to display the selected map data on the client-side computer. Alternatively, a rendering program may be executed at the server side to operate on the raw map data and generate rendering data that need only be transmitted to the client side for display on the client-side computer. In other embodiments, map data can be generated and maps may be rendered from any other source.

Before the keywords can be visualized (i.e. before they can appear on a map), the visualization data must be applied to the keywords in accordance with a visualization scheme (i.e. the application of appearance information to keywords in accordance to keyword relevance). When visualization data is applied to a keyword, the result may be referred to herein as presentation data. For example, the presentation data for "flagsofourfathers" may comprise the text "flagsofourfathers" along with code for rendering the text in 12-point font, specification of colors and other visual elements, as well as specification regarding the visual/map location in which to render the keyword.

The presentation data may be pre-computed all at once, in advance of any selection of a map area, or may be computed in an ad hoc manner "on the fly," only when a particular map area is specified. When the presentation data is pre-computed, presentation data is generated from all keywords without regard to the location associated with the keywords. However, only the presentation data that is located within the map area selected by the user will be visualized (appear on the map). When the presentation data is computed in an ad hoc manner, presentation data is generated from only those keywords associated with a location within the selected map area. Presentation data may be generated by a server located at the server side, or by a computer located at the client side. In still other embodiments, the presentation computation mode is user-selectable.

In step S602, a determination may be made as to whether the generation of presentation data is to be pre-computed all at once, in advance of any selection of a map area, or to be computed in an ad hoc manner "on the fly," only when a particular map area is specified (see S602-A). When the visualization data is pre-computed, visualization data is generated from all keywords in the dataset without regard to the location associated with the keywords. When the visualization data is computed in an ad hoc manner, visualization data is generated from only those keywords associated with a location within the selected map area (see S602-B). In location-dependent generation of presentation data, the user may select a map area first, and only those keywords located within the selected map area will be converted to presentation data. In still other embodiments, the visualization mode is user-selectable (see S602-C).

If the generation of presentation data is flat, step S604 determines the location-based keywords to be subjected to pre-computed generation of presentation data. In some embodiments, all location-based keywords are pre-computed and converted into presentation data (see S604-A). The location-based keywords to be visualized may already have been limited to a particular category (e.g. cities), or may fall into a number of different categories (e.g. cities, landmarks, movies, people and the like.) In other embodiments, the generation of presentation data is category-dependent (see S604-B). If the generation of presentation data is category-dependent, all keywords may have a "category" parameter (e.g. cities, landmarks, movies, people, and the like), and the user may select one or more of these categories of keywords to be converted to presentation data.

Step S606 determines how the selected location-based keywords will be visualized. In some embodiments, all presentation data will follow the same visualization scheme. Any number of visualization schemes may be employed, including, but not limited to, varying the appearance of a keyword utilizing an appearance characteristic such as size (e.g. with more popular or more recent keywords being larger), color (e.g. with more popular or more recent keywords being brighter colors (red for the most popular or more recent keywords)), shadings (e.g. with more popular or more recent keywords being darker), three-dimensional (e.g. with more popular or more recent keywords being taller), blinking or animation (e.g. with more popular or more recent keywords blinking faster, fading in and out faster, moving or wiggling faster, etc.), and the like. In addition to these visualization schemes, the keywords themselves may be supplemented by or replaced with appearance elements such as symbols, icons, links to web sites or web pages, graphics, thumbnail pictures, and the like, and these items may also vary in size, color, or shading, and may blink, fade in and out, pop-up, and the like. The visualization algorithm may have a fixed visualization scheme for all keywords or may have different schemes for different keyword categories, or alternatively the visualization schemes may be user-selectable.

Step S608 applies the visualization scheme to the location-based keywords to be converted to presentation data. For example, if "movie titles" appearing in text messages are to be converted according to where the text message was sent, and a font size visualization scheme is to be employed using three font sizes, then the three most relevant (e.g. popular) keywords (e.g. "Flags of Our Fathers," "The Prestige," and "Marie Antoinette") having a keyword category of "movie title" would be assigned to the appropriate font sizes. In other embodiments, some presentation data may be assigned the same appearance information (e.g. assigned the same font size) to indicate similar relevance characteristics. One skilled in the art will recognize that a similar assignment of visualization scheme to keywords can be applied to other visualization schemes and keyword categories.

In some embodiments of the invention, the presentation data can be dependent on zoom level, screen-viewable area, type of screen, screen resolution and the like, and the decisions on how to further modify the presentation data may be made either in the client or the server. For example, if the presentation data includes keywords sized in five different fonts according to some measure of keyword relevance, but a server or processor at either the client or server determines or is made aware that either the zoom level is very high (i.e. "zoomed out"), the screen size is small, and/or the screen resolution is low, the smallest font sizes may not be readable. Accordingly, the server or processor may further modify the presentation data to increase all font sizes, eliminate the presentation data with font sizes smaller than a certain level, or take other measures to ensure that the presentation data that is ultimately visualized is readable. In another example, if the presentation data includes keywords in five different colors according to some measure of keyword relevance, but a server or processor at either the client or server determines or is made aware that the display device is monochrome (e.g. black and white) or limited in color resolution, the color distinctions may not be visible when visualized. Accordingly, the server or processor may further modify the presentation data to replace color distinctions with some other visual distinction (e.g. font size distinctions) or take other measures to ensure that the presentation data that is ultimately visualized is properly distinguishable. In yet another example, if the presentation data includes keywords in one or more fonts according to some measure of keyword relevance, but a server or processor at either the client or server determines or is made aware that the screen resolution is insufficient to make the different fonts distinguishable or that one or more of the fonts are not supported, the font distinctions may not be visible when visualized. Accordingly, the server or processor may further modify the presentation data to replace font distinctions with some other visual distinction (e.g. color distinctions) or take other measures to ensure that the presentation data that is ultimately visualized is properly distinguishable. Those skilled in the art will recognize that any number of presentation data modifications may be made to ensure that the visualized keywords are properly distinguishable.

Step S610 determines the map area to be displayed. In some embodiments, the map area is fixed (see S610-A), but other embodiments, the map area is user-selectable (see S610-B).

Step S612 determines if the visualization is to be time-dependent. In some embodiments, there is no time-dependency (see S612-A). If no time-dependency is selected, all location-based keywords to be visualized will be visualized. In other embodiments, visualization is time-dependent (see S612-B), and only those keywords having a time/date stamp (a temporal parameter associated with the keyword) corresponding to a particular time, date or range will be visualized. In still other embodiments, this is user-selectable (see S612-C). In time-dependent visualization, either the visualization algorithm may automatically determine a time, date or range (in some embodiments selecting the range based on the keywords to be visualized having the earliest and latest time/date stamps) and whether the visualization is to be animated, or the user may select a time, date or range and whether the visualization is to be animated. Also, the changes in time may also mean the same keywords will be shown but with other properties (e.g. change color, size, and the like).

The presentation data may then be rendered (visualized) by a server located at the server side, or by a computer located at the client side.

Step S614 visualizes the location-based keywords by applying the keywords according to the visualization scheme to the map data, and step S616 sends this modified map data to the user for rendering on the user's web browser. In other embodiments, map data and presentation data are separately sent to the user's web browser for combining and rendering. In time-independent visualization, only a single map is rendered. However, in time-dependent visualization, a fixed or user-selectable time, time/date, time range or date range may be used to limit the keywords to be displayed. For example, if a particular time, time/date, time range or date range is selected (e.g. "5 p.m.", "5 p.m. on Oct. 24, 2006," "5-7 p.m.", or "Oct. 26, 2006 through Oct. 28, 2006"), all keywords having temporal keyword parameters falling within that range will be displayed on a single map. In some embodiments, as the time changes, the same presentation data may be visualized with changes to color, size or other presentation characteristics. Alternatively, if a particular time or date range is selected, a sequence of modified map data may be transmitted for rendering, each set of modified map data in the sequence representing a different time or date in the selected time or date range. As these views are rendered, the keywords will appear and disappear in accordance with their associated time/date stamps. The views may be rendered automatically, giving the user a time-dependent animation, or the user may step through the different views one at a time.

Note that if the user "pans" to a different location, effectively selecting a different map area, the visualization process (step S614) and transmission process (step S616) will be repeated in preparation for map is re-rendering. When this occurs, some previously hidden keywords may appear, and some previously displayed keywords may disappear.

Additionally, if the user zooms in and out, effectively selecting a different map area, the visualization process (step S614) and transmission process (step S616) will be repeated when the map is re-rendered. When this occurs, in some embodiments the displayed keywords may change according to a visualization level parameter associated with the keywords. For example, if a user is viewing a map of San Francisco, a Golden Gate Bridge (GGB) keyword may appear, as will other keywords having a visualization level parameter of "city." However, as the user zooms out to view a map of all of California, the label for GGB may disappear, and only a label for San Francisco may appear, as will other keywords having a visualization level parameter of "state." In other words, a visualization level parameter may be attached to each keyword that identifies a particular zoom or geographic level (e.g. city, state, etc). Alternatively or additionally, the keywords may be filtered according to some other parameter such as frequency of occurrence, so that only a subset of the keywords is shown. For example, if a user is viewing a map of San Francisco with a visualization level of "city," all restaurants with 10 or more occurrences or some threshold value may appear. However, at a visualization level of "state," only restaurants with 50 or more occurrences may appear, or only the five restaurants with the most occurrences may appear.

If the visualization is location-dependent, the user may select a map area first. Step S618 determines the map area to be displayed. This step is similar to step S610. Step S620 determines the keywords to be converted to presentation data. This step is similar to step S604, except that only those location-based keywords located within the geographic range of the selected map area will be converted to presentation data. Step S622 determines how the selected keywords will be visualized. This step is similar to step S606. Step S624 applies the visualization scheme to the keywords to be visualized. This step is similar to step S608. Step S612 determines if the visualization is to be time-dependent. Step S614 visualizes the keywords by applying the keywords according to the visualization scheme to the map data, and step S616 sends this modified map data to the user for rendering on the user's web browser.

While embodiments of the invention have been described in terms of particular embodiments and illustrative figures, those of ordinary skill in the art will recognize that embodiments of the invention are not limited to the embodiments or figures described. Although embodiments of the invention are described, in some instances, using client/server terminology, those skilled in the art will recognize that such terms are also used in a generic sense herein, and that embodiments of the invention are not limited to such systems or models.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 7:
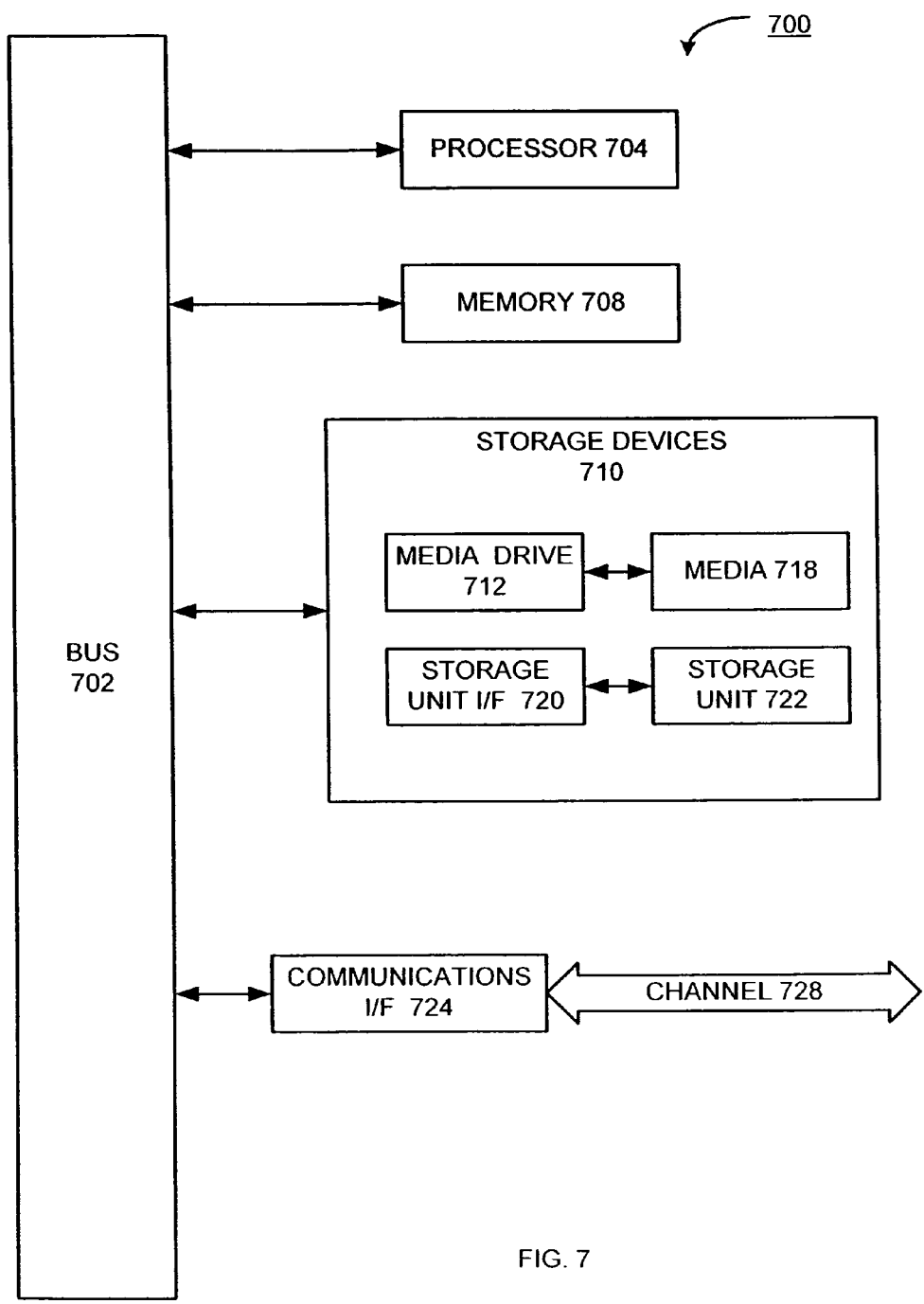
FIG. 7 illustrates an exemplary computer system that may be employed to implement embodiments of the invention.

FIG. 7 illustrates a typical computing system 700 that may be employed to implement processing functionality in embodiments of the invention. Computing systems of this type may be used in the any one or more of the context server, main server, second server, map server, and user computer, for example. Those skilled in the relevant art will also recognize how to implement embodiments of the invention using other computer systems or architectures. Computing system 700 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disk (CD) or digital versatile disk (DVD) drive (R or RW), or other removable or fixed media drive. Storage media 718, may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other network interface card (NIC)), a communications port (such as for example, a USB port), a PCMCIA slot and card, etc. Software and data transferred via communications interface 724 are in the form of signals which can be electronic, electromagnetic, optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as "computer program code" (which may be grouped in the form of computer programs or other groupings), when executed, enable the computing system 700 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of embodiments of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although embodiments of the invention have been described in connection with some embodiments, it is not intended to be limited to the specific form set forth herein. Rather, the scope of embodiments of the invention is limited only by the claims. Additionally, although a feature may appear to be described in connection with particular embodiments, one skilled in the art would recognize that various features of the described embodiments may be combined in accordance with embodiments of the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A computer-implemented method for visualizing location-based keywords according to their relevance, comprising:
    altering an appearance of each of one or more location-based keywords in accordance with a relevance parameter associated with the keyword using a computer processor, the one or more location-based keywords including one or more geographically independent keywords that have been associated with a geographical location; and
    providing for display to a user each location-based keyword on a map in accordance with a location parameter associated with the keyword.

2. The method of claim 1, comprising altering the appearance of the keywords utilizing an appearance characteristic selected from the group consisting of font size, font style, color, shading, three-dimensional height, and animation.

3. The method of claim 1, comprising altering the appearance of the keywords utilizing an appearance element selected from the group consisting of symbols, links, graphics, and thumbnails.

4. The method of claim 1, comprising altering the appearance of the keywords in accordance with viewing limitations selected from the group consisting of zoom level, screen-viewable area, type of screen, screen resolution, screen colors, and supported fonts.

5. The method of claim 1, comprising receiving visualization data, the visualization data including the one or more location-based keywords and the relevance parameter and a location parameter associated with each of the keywords.

6. The method of claim 5, comprising altering the appearance of all of the location-based keywords in the visualization data.

7. The method of claim 5, the visualization data including a category parameter associated with each keyword, the method comprising altering the appearance of only those location-based keywords in the visualization data having one or more particular category parameters.

8. The method of claim 5, comprising altering the appearance of only those location-based keywords in the visualization data within a selected map area.

9. The method of claim 5, the visualization data including a temporal parameter associated with each keyword, the method comprising displaying each location-based keyword on the map in accordance with the location parameter associated with the keyword for only those keywords in the visualization data having an associated temporal parameter falling within a particular range.

10. The method of claim 5, comprising altering the appearance of each of one or more location-based keywords in accordance with a popularity parameter associated with the keyword for only those location-based keywords in the visualization data having an associated location parameter falling within a geographic range defined by the map data.

11. An apparatus for visualizing location-based keywords according to their relevance, wherein the apparatus includes a computer readable storage medium having computer readable instructions for:
    apply applying a visualization scheme to one or more location-based keywords, the one or more location-based keywords including geographically independent keywords that have been associated with a geographical location, the visualization scheme generating presentation data in accordance with a relevance parameter associated with the keyword.

12. The apparatus of claim 11, further comprising computer readable instructions for receiving visualization data, the visualization data including the one or more location-based keywords and the relevance parameter and a location parameter associated with each of the keywords.

13. A main server comprising the apparatus of claim 12.

14. A server system comprising the main server of claim 13, and comprising a context server coupled to the main server for providing the visualization data.

15. A server system comprising the main server of claim 13, and comprising a map server coupled to the main server for providing the map data.

16. The apparatus of claim 12, further comprising computer readable instructions for applying the visualization scheme to all of the location-based keywords in the visualization data.

17. The apparatus of claim 12, further comprising computer readable instructions for integrating the presentation data for each location-based keyword with map data in accordance with the location parameter associated with the keyword to enable the one or more keywords to be rendered along with the map data in accordance with their location and relevance.

18. A computer-readable storage medium comprising computer-readable instructions for visualizing location-based keywords according to their relevance, the instructions comprising:
    altering an appearance of each of one or more location-based keywords in accordance with a relevance parameter associated with the keyword, the one or more location-based keywords including one or more geographically independent keywords that have been associated with a geographical location; and
    providing for display to a user each location-based keyword on a map in accordance with a location parameter associated with the keyword.

19. The computer-readable storage medium of claim 18, comprising instructions for receiving visualization data, the visualization data including the one or more location-based keywords and the relevance parameter and a location parameter associated with each of the keywords.

20. The computer-readable storage medium of claim 19, comprising instructions for altering the appearance of all of the location-based keywords in the visualization data.

21. The computer-readable storage medium of claim 19, comprising instructions for altering the appearance of only those location-based keywords in the visualization data within a selected map area.

22. The computer-readable storage medium of claim 19, comprising instructions for altering the appearance of each of one or more location-based keywords in accordance with a popularity parameter associated with the keyword for only those location-based keywords in the visualization data having an associated location parameter falling within a geographic range defined by the map data.

23. The computer-readable storage medium of claim 18, comprising instructions for altering the appearance of the keyword utilizing an appearance characteristic selected from the group consisting of font size, font style, color, shading, three-dimensional height, and animation.

24. The computer-readable storage medium of claim 18, comprising instructions for altering the appearance of the keyword utilizing an appearance element selected from the group consisting of symbols, links, graphics, and thumbnails.

25. The computer-readable storage medium of claim 18, comprising instructions for altering the appearance of the keywords in accordance with viewing limitations selected from the group consisting of zoom level, screen-viewable area, type of screen, screen resolution, screen colors, and supported fonts.

* * * * *